(12) United States Patent
Peters

(10) Patent No.: US 8,886,371 B2
(45) Date of Patent: Nov. 11, 2014

(54) METHOD AND SYSTEM FOR HIGH FIDELITY VTOL AND HOVER CAPABILITY

(76) Inventor: William C. Peters, N. Bellmore, NY (US)

( * ) Notice: Subject to any disclaimer, the term of this patent is extended or adjusted under 35 U.S.C. 154(b) by 392 days.

(21) Appl. No.: 12/987,434

(22) Filed: Jan. 10, 2011

(65) Prior Publication Data
US 2012/0179308 A1 Jul. 12, 2012

(51) Int. Cl.
*B64G 1/36* (2006.01)
*G05D 1/08* (2006.01)
*B64G 1/26* (2006.01)
*B64G 1/24* (2006.01)

(52) U.S. Cl.
CPC ............... *G05D 1/0858* (2013.01); *B64G 1/26* (2013.01); *B64G 1/36* (2013.01); *B64G 1/24* (2013.01); *B64G 1/361* (2013.01); *G05D 1/0883* (2013.01)
USPC ............................ 701/13; 244/12.4; 244/23 A

(58) Field of Classification Search
CPC .......... G05D 1/0883; B64G 1/36; B64G 1/26; B64G 1/24; B64G 1/361
USPC ....... 244/12.3, 90 R, 75.1, 87, 30, 12.4, 23 A, 244/115, 17.23, 6, 2; 701/12, 4, 13, 3, 5; 414/137.6; 901/1; 60/229; 211/12.1
See application file for complete search history.

(56) References Cited

U.S. PATENT DOCUMENTS

| | | | |
|---|---|---|---|
| 4,093,155 A | 6/1978 | Kincaid, Jr. | |
| 4,301,761 A | 11/1981 | Fry et al. | |
| 4,482,110 A | 11/1984 | Crimmins, Jr. | |
| 4,804,155 A | 2/1989 | Strumbos | |
| 5,115,996 A | 5/1992 | Moller | |
| 5,294,079 A | 3/1994 | Draznin | |
| 5,419,514 A | 5/1995 | Ducan | |
| 5,505,155 A | 4/1996 | Adams | |
| 5,823,468 A | 10/1998 | Bothe | |
| 5,826,830 A | 10/1998 | Abernethy | |
| 6,095,078 A | 8/2000 | Adams | |
| 6,352,219 B1 | 3/2002 | Zelic | |
| 6,565,043 B1 | 5/2003 | Wittmann | |
| 6,793,174 B2 | 9/2004 | Ouellette et al. | |
| 6,808,140 B2 | 10/2004 | Moller | |
| 6,843,447 B2 | 1/2005 | Morgan | |
| 6,886,776 B2 | 5/2005 | Wagner et al. | |
| 6,892,980 B2 | 5/2005 | Kawai | |
| 7,149,611 B2 | 12/2006 | Beck et al. | |
| 7,159,817 B2 | 1/2007 | VanderMey et al. | |
| 7,182,295 B2 | 2/2007 | Redmond | |
| 7,357,352 B2 | 4/2008 | Speer et al. | |
| 7,699,260 B2 | 4/2010 | Hughey | |
| 2006/0097107 A1 | 5/2006 | Parks et al. | |
| 2006/0151666 A1* | 7/2006 | VanderMey et al. | 244/12.3 |
| 2009/0152391 A1* | 6/2009 | McWhirk | 244/30 |
| 2009/0224095 A1* | 9/2009 | Cox et al. | 244/17.23 |
| 2009/0236470 A1* | 9/2009 | Goossen et al. | 244/115 |
| 2010/0224721 A1 | 9/2010 | Wood et al. | |
| 2011/0184593 A1* | 7/2011 | Swope | 701/12 |
| 2012/0056040 A1* | 3/2012 | Brotherton-Ratcliffe et al. | 244/23 A |
| 2012/0091257 A1* | 4/2012 | Wolff et al. | 244/12.4 |
| 2012/0145834 A1* | 6/2012 | Morgan et al. | 244/90 R |

* cited by examiner

*Primary Examiner* — Behrang Badii
(74) *Attorney, Agent, or Firm* — Fay Kaplun & Marcin, LLP

(57) ABSTRACT

A vehicle having a plurality of thruster components, wherein each of the thruster components includes a plurality of sub-thrusters, each sub-thruster being grouped into one of a plurality of control groups. The vehicle including a control system receiving information related to the vehicle, wherein the control system selects one of the control groups and activates the sub-thrusters of the selected control group.

8 Claims, 12 Drawing Sheets

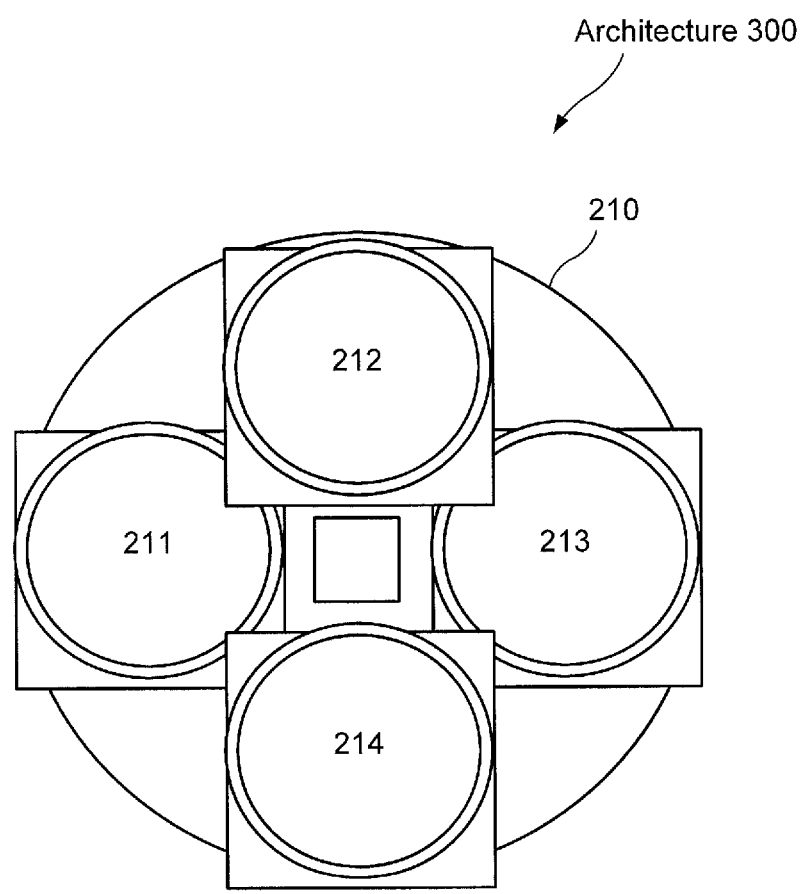
F I G. 3

METHOD AND SYSTEM FOR HIGH FIDELITY VTOL AND HOVER CAPABILITY

BACKGROUND

A vertical take-off and landing ("VTOL") vehicle is a classification of aircraft that includes aircraft that can hover, take off and land vertically as well as helicopters and other aircraft with powered rotors. Vehicles designed to operate in extraordinary environments having uneven terrain often utilize VTOL system. Accordingly, VTOL vehicles typically operate in environments where runways or even a suitably flat surface for landing skids is nonexistent. The common forms of VTOL and hover vehicles are helicopters, thrust vectoring jets, tilt-rotors, quadrotors and their variants. Helicopters are the most classic form of a VTOL vehicle, and the standard for tasks requiring vehicles with VTOL or hovering capabilities. The militaries implementation of the V-22 Osprey is the only major tilt rotor vehicle in use today. Quadrotor vehicles have become more common amongst small hovering unmanned aerial vehicle ("UAV") systems. However, typical designs use both quadrotor and tilt rotor concepts for VTOL and transition to flight. The exemplary systems and methods described herein will look further at the basic quadrotor architecture and how to improve upon it.

SUMMARY OF THE INVENTION

A vehicle having a plurality of thruster components, wherein each of the thruster components includes a plurality of sub-thrusters, each sub-thruster being grouped into one of a plurality of control groups and a control system receiving information related to the vehicle, wherein the control system selects one of the control groups and activates the sub-thrusters of the selected control group.

A method for receiving information related to a vehicle, selecting one of a plurality of control groups of sub-thrusters of the vehicle, wherein the vehicle includes a plurality of thruster components, each of the thruster components includes a plurality of sub-thrusters, each sub-thruster being grouped into the one of a plurality of control groups and outputting a control signal to control the sub-thrusters of the one of the control groups.

A non-transitory computer readable storage medium including a set of instructions that are executable by a processor. The set of instructions being operable to receive information related to a vehicle, select one of a plurality of control groups of sub-thrusters of the vehicle, wherein the vehicle includes a plurality of thruster components, each of the thruster components includes a plurality of sub-thrusters, each sub-thruster being grouped into the one of a plurality of control groups and output a control signal to control the sub-thrusters of the one of the control groups.

BRIEF DESCRIPTION OF THE DRAWINGS

FIG. 3 shows an exemplary architecture wherein a thrust component is divided into multiple smaller thrusters, or sub-thrusters, according to an exemplary embodiment.

DETAILED DESCRIPTION

Figure 1:
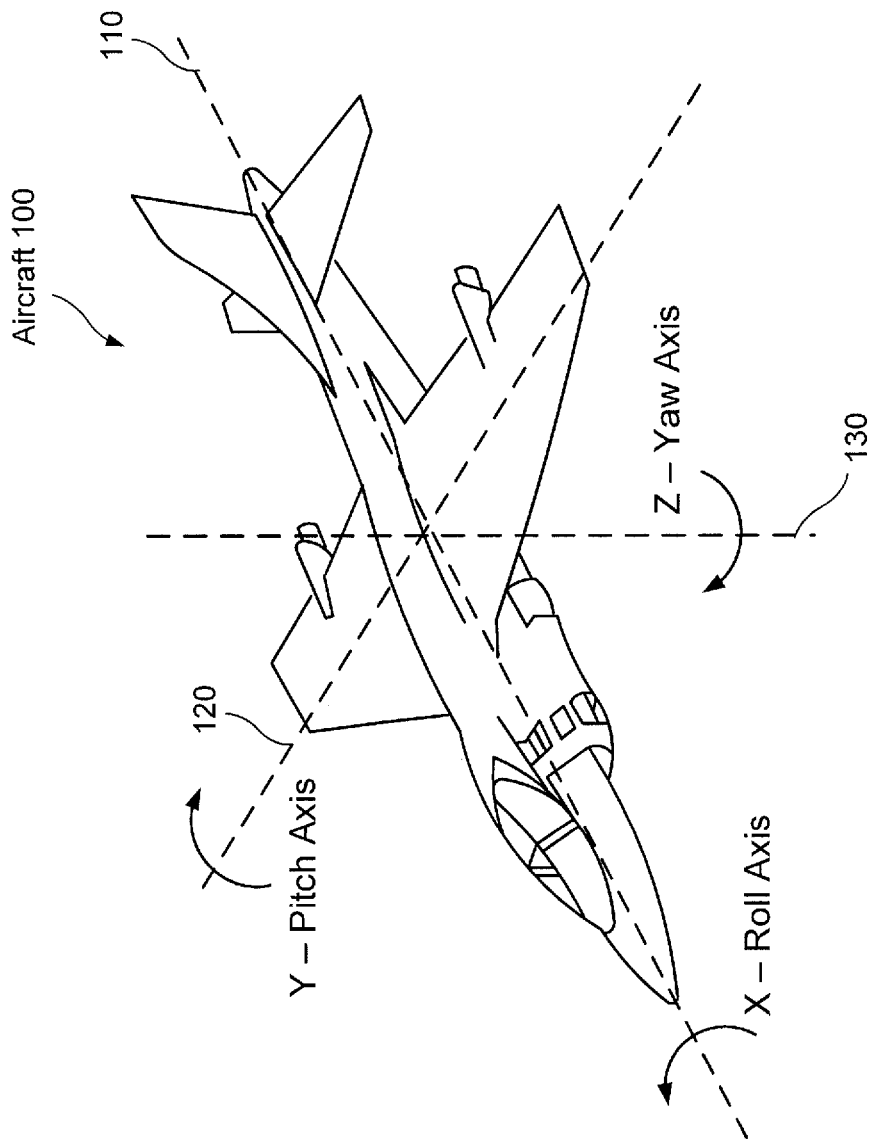
FIG. 1 shows an example of an axis system of an aircraft defined along an x-axis, a y-axis, and a z-axis according to an exemplary embodiment.

The exemplary embodiments may be further understood with reference to the following description of exemplary embodiments and the related appended drawings, wherein like elements are provided with the same reference numerals. The exemplary embodiments are related to systems and methods for a high fidelity control system for a vehicle, such as a Vertical take-off and landing ("VTOL") vehicle. Specifically, the exemplary embodiments relate to control systems and multi-axis hover capabilities using differential thrusts.

Vehicles with hovering capabilities, such as VTOL capabilities require an extremely responsive control system in order to suppress any undesirable vehicle dynamics. Specifically, the control system employed should allow for the user to maintain a certain vehicle operation as the vehicle changes position or simply holds a position in space. Accordingly, in order to perform such responsive hovering and VTOL maneuvers, the vehicle should be able to hold any changes in rotation about three axes, namely a roll axis, a pitch axis, and a yaw axis, in order to minimize and control translations along each of these axes.

As illustrated in FIG. 1, an axis system of an aircraft 100 may be defined along an x-axis 110, a y-axis 120, and a z-axis 130. Angular rotation by the aircraft 100 about each of these axes 110-130 provides for various movements of the aircraft. Specifically, rotation along the x-axis 110 accounts for roll; rotation along the y-axis 120 accounts for pitch; and rotation along the z-axis 130 accounts for yaw. The coordinate system illustrated in FIG. 1 may be referenced throughout the description of the various embodiments.

The take-off and hovering capabilities of a VTOL vehicle is a complicated operation considering the amount of force being used to lift the vehicle needs to be equal to the weight of the vehicle (e.g., a 1 g force). This 1 g force should be applied in such a manner as to allow the vehicle to hover in a specified location while not becoming unstable due to disturbances and other effects as due to external environmental forces. Accordingly, the control system of the vehicle needs to assess these disturbances and respond rapidly. This response will require the vehicle to quickly change the forces and torques acting on the vehicle. In addition, the system data and sensor information (e.g., feedback information) provided to the control system should be extremely accurate. For example, a minor disturbance as small as a 2-degree rotation of a 1 g force vector may cause the vehicle to move over 1 meter in less than 3 seconds. Therefore, as will be described in greater detail below, the exemplary embodiments may implement a control system with accurate feedback information, high frequency control signal responses, and rapid system response to the control signals. The exemplary systems and method described herein may dramatically improve the control system frequency and system response time by dividing a primary thrust component into multiple control architectures. Furthermore, these multiple control architectures may be utilized in such a way that the vehicle and the operation of the vehicle will be more stable while maintaining a relatively simple design. The exemplary systems also allow for a robust system capable of surviving thruster failure. As will be described in greater detail below, the exemplary embodiments include a high frequency system response that also allows for more effective adaptive learning control methods to quickly account for thruster failure.

Throughout this disclosure, the exemplary embodiments will be directed to system and methods including a architecture for applications related to an aircraft, such as quadrotor aircraft. However, it should be noted that the exemplary systems and methods described herein are not limited to aircraft, and may be applied to any form of transportation, such as air, sea, and spacecraft (e.g., a space exploration vehicle), as well as any combination of forms. Furthermore, the exemplary systems and methods may be applied toward an architecture having any number of rotors, rotor engines, thrust components, fan components or any other type of propulsion components for controlling the movements of the vehicle. Throughout the description the terms "rotors," "rotor engines," "thrust components," "fans," "fan components," "propulsion components" and variations thereof will be used interchangeably to describe any means of providing force to the vehicle.

Figure 2:
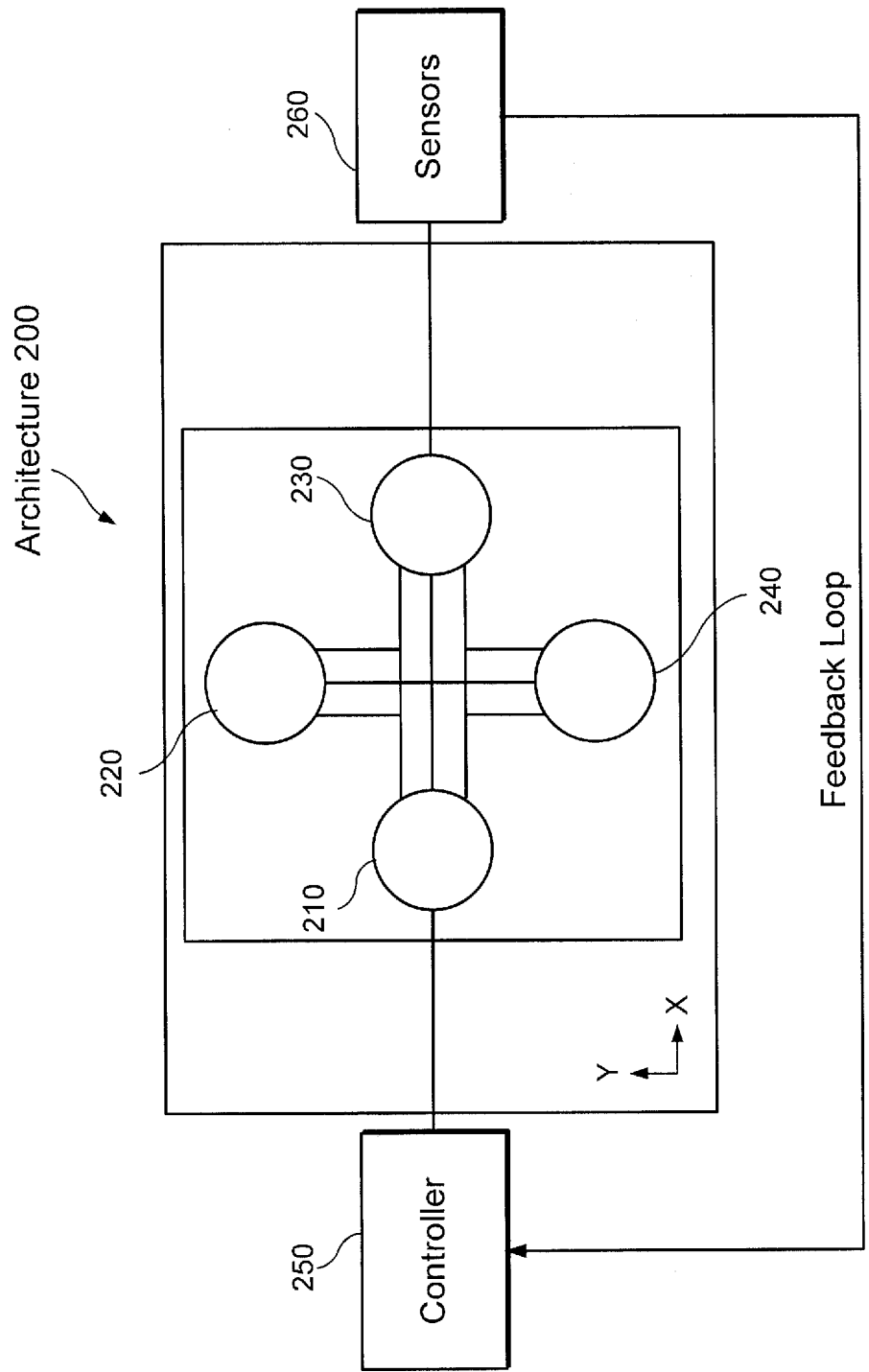
FIG. 2 shows a quadrotor vehicle architecture including four primary rotors or thrust components in order to provide lift to the vehicle according to an exemplary embodiment.

As illustrated in FIG. 2, a simplified quadrotor vehicle architecture 200 may include four primary rotor engines, rotors or thrust components 210-240 in order to provide lift to an exemplary vehicle. It should be noted that the exemplary systems and methods are not limited to the quadrotor embodiment, and thus may be implemented in a vehicle having any number of rotors and/or thrust components. Each of the thrust components 210-240 may be arranged in such a manner to control the pitch and roll of the vehicle through the use of differential thrust. Specifically, the thruster components 210 and 230 are located on opposite sides of the y-axis, and thus may control the pitch of the vehicle. The thruster components 220 and 240 are located on opposite sides of the x-axis, and thus may control the roll of the vehicle. The combined thrust of all four thrust components 210-240 controls the z-axis translations.

In addition, z-axis rotations may be controlled by having a thrust pair of 210 and 230 operating in an opposite direction of the thrust pair of 220 and 240. Accordingly, each thrust pair provides half of the total thrust, and thus cause equalizing torques in the yaw direction, about the z-axis. Translations in either the x- or y-axis may be created by inducing a slight tilt in the orientation of the vehicle by using differential thrust from one of the thrust pairs. For example, to translate in the positive x-direction, the thrust component 210 may be increased and the thrust component 230 may be decreased. Accordingly, this differential may cause a pitch angle tilting the rotors to create a component force in the x-axis. Depending on the duration of the tilt and the size of the tilt, the resulting velocity and translation may vary.

The simplified quadrotor vehicle architecture 200 may further include a controller 250 and sensors 260 that provide a feedback loop to the controller 250. The controller 250 may control the operation of each of the thrust components 210-240 individually, as configured thrust pairs, as well as in unison. The sensors 260 may measure any parameter of the thrust components 210-240 (e.g., thrust output, efficiency, etc.), the vehicle (orientation, velocity, altitude, etc.) or the surrounding environment (wind speed, wind direction, etc.) to provide feedback information related to vehicle movement during its operation to stabilize thruster components 210-240. The primary control issues with a quadrotor vehicle are maintaining the vehicle's orientation in the pitch and roll directions. Accordingly, the controller 250, based on the feedback received from the sensors 260, may adjust the thrust level of thrust pairs in order to prevent the rotation of the vehicle, as well as preventing the vehicle from over-rotation in one direction or losing enough thrust to maintain flight/hover of the vehicle. In short, the stabilization of the pitch and roll angles of the vehicle are key in maintain overall control of the vehicle. It should be noted that the use of a single controller 250 is only exemplary and that multiple controllers and/or control elements may be used to control the thrust components 210-240.

FIG. 3 shows an exemplary architecture 300 wherein a thrust component 210 is divided into multiple smaller thrusters, or sub-thrusters 211-214, according to an exemplary embodiment. It should be noted that the components illustrated in FIG. 3 are not to scale and are merely for comprehension purposes, as opposed to describing the dimensions of the architecture's components.

Accordingly, when these sub-thrusters 211-214 are combined, the exemplary architecture 300 may have the same general control effect on a vehicle as one of the larger thrust components 210-240. In other words, the general control logic of motions for the quadrotor system may still hold. If each sub-thruster 211-214 is simply a fraction of the larger thrust component 210 and each sub-thruster is controlled with a control logic that utilizes all of the sub-thrusters 211-214 at once (e.g., as if controlling specific thrust component 210), then the sub-thruster system may operate in the same manner as the quadrotor vehicle architecture 200 of FIG. 2. For instance, simultaneously increasing the thrust of all sub-thrusters 211-214 within the thrust component 210 while decreasing all of the sub-thrusters within the thrust component 230 will still cause the vehicle to pitch and translate on the x-axis.

However, if a control logic is used that recognizes these sub-thrusters 211-214 within each of the thrust components 210-240, the characteristics of the system's control logic may be adjusted accordingly. Specifically, combining the effects of the sub-thrusters 211-214 with a unique control system, the architecture may represent a larger component thruster having vastly different properties. The use of multiple sub-thrusters 211-214 and these differences in these properties may allow for a high fidelity vehicle control system. High fidelity of control to the vehicle translates into extremely accurate station keeping (e.g., maintaining position and orientation), as well as extremely accurate performance in dynamic environments.

Figure 4:
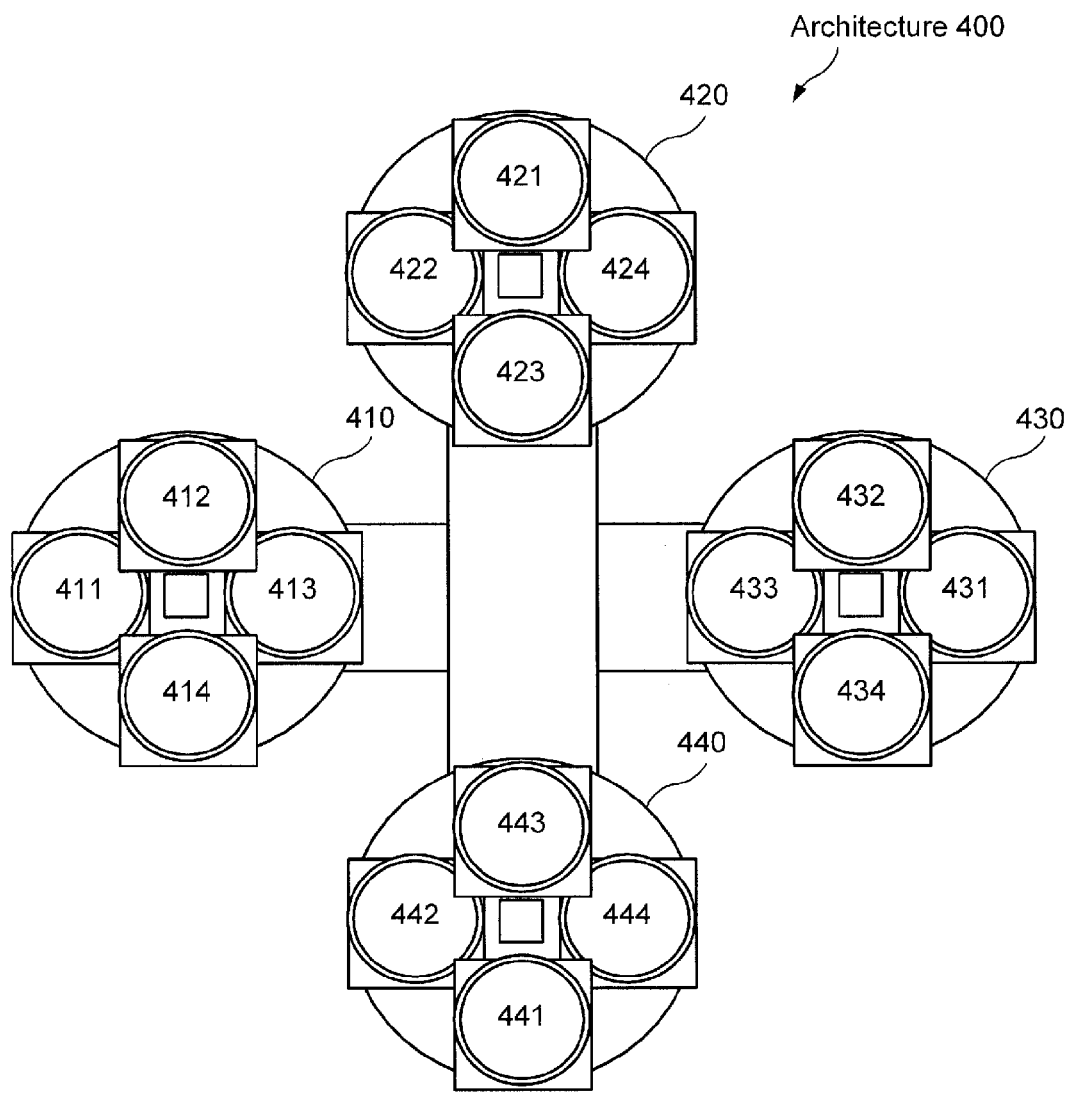
FIG. 4 shows an exemplary architecture wherein the four thrust components are each divided into multiple smaller thrusters, or sub-thrusters, according to an exemplary embodiment.

FIG. 4 shows an exemplary architecture 400 wherein four thrust components 410-440 are each divided into multiple smaller thrusters, or sub-thrusters, according to an exemplary embodiment. It should be noted that the architecture 300 from FIG. 3 of the single thrust component 210 may account for a quadrant of the architecture 400 from FIG. 4. Similar to FIG. 3, each of the thrust components 410-440 may be divided into four smaller sub-thrusters. Specifically, the thrust component 410 may include sub-thrusters 411-414; the thrust component 420 may include sub-thrusters 421-424; the thrust component 430 may include sub-thrusters 431-434; and the thrust component 440 may include sub-thrusters 441-444. The configuration for the sub-thrusters of each thrust component may be arranged so that like-numbered sub-thrusters are equidistant to the center of the architecture. In other words, sub-thrusters 411, 421, 431, and 441 may be positioned as the outer-most (e.g., furthest to center) sub-thrust within each thrust component 410, 420, 430, and 440, respectively. In addition, sub-thrusters 413, 423, 433, and 443 may be positioned as the inner-most (e.g., closest to center) sub-thrust within each thrust component 410, 420, 430, and 440, respectively. The operations and methods for the architecture 400 will be described in detail below.

Figure 6:
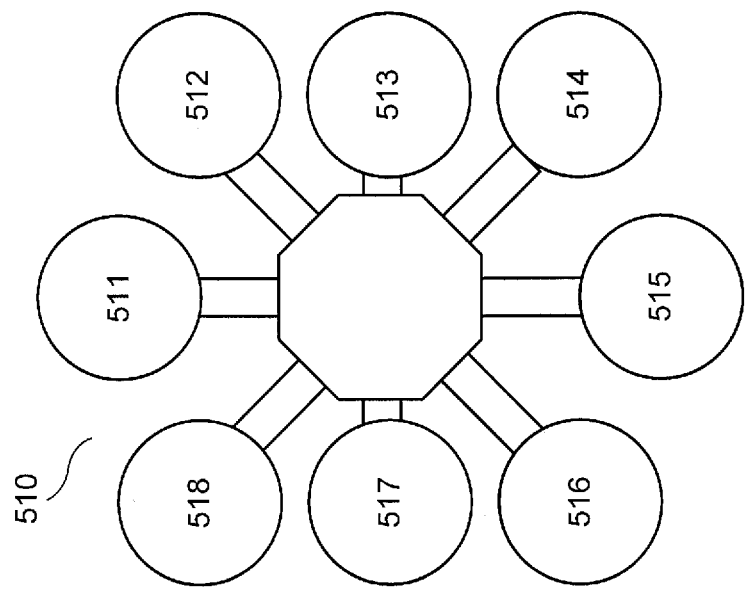
FIG. 6 shows an exemplary vehicle having eight thrust components.
Figure 5:
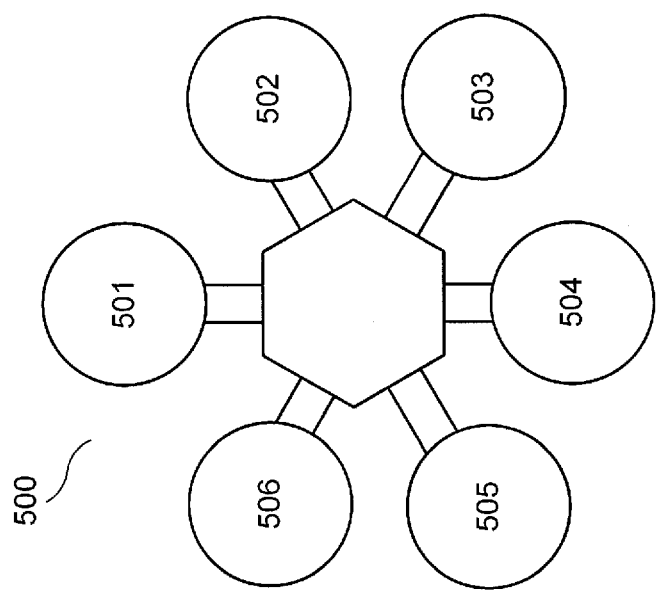
FIG. 5 shows an exemplary vehicle having six thrust components.
Figure 9:
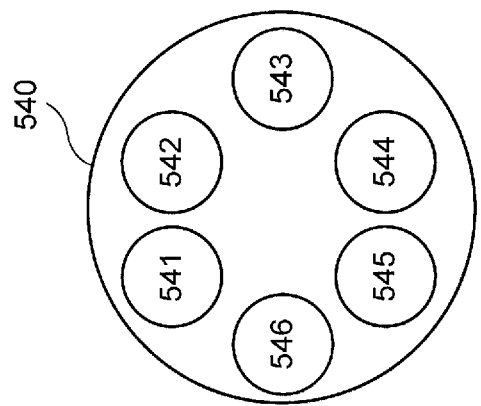
FIG. 9 shows a sub-thruster architecture having six sub-thrusters.
Figure 8:
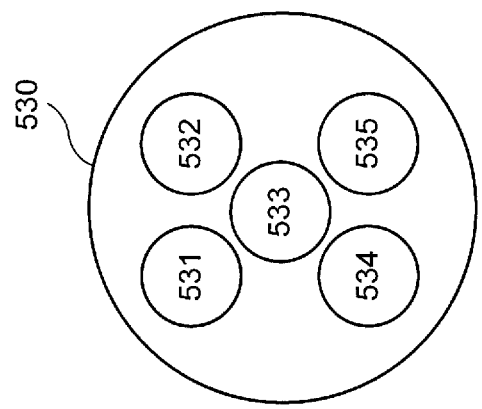
FIG. 8 shows a sub-thruster architecture having five sub-thrusters.
Figure 7:
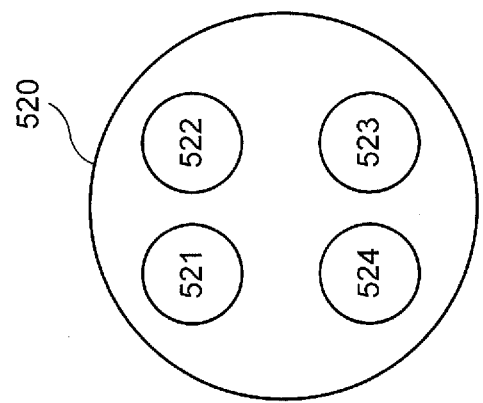
FIG. 7 shows a sub-thruster architecture having four sub-thrusters.

While the architecture 400 of FIG. 4 depicts a 16-thruster design, it should be noted that any number of thrust components, each having any number of sub-thrusters may be implemented by the systems and methods described herein. For example, FIG. 5 shows an exemplary vehicle 500 having six thrust components 501-506. FIG. 6 shows an exemplary vehicle 510 having eight thrust components 511-518. FIG. 7 shows a sub-thruster architecture 520 having four sub-thrusters 521-524. Comparing the sub-thruster architecture 520 of FIG. 7 to the sub-thruster architecture 300 of FIG. 3, it can be seen that each architecture has four sub-thruster components. However, the arrangement of the sub-thruster components in the architectures is different. FIG. 8 shows a sub-thruster architecture 530 having five sub-thrusters 531-535. FIG. 9 shows a sub-thruster architecture 540 having six sub-thrusters 541-546. As described above, the exemplary control systems described herein may be applied to any type of architecture or configuration. The examples provided in FIGS. 5-9 are provided to show that there are any number of architectures and configurations.

Figure 10:
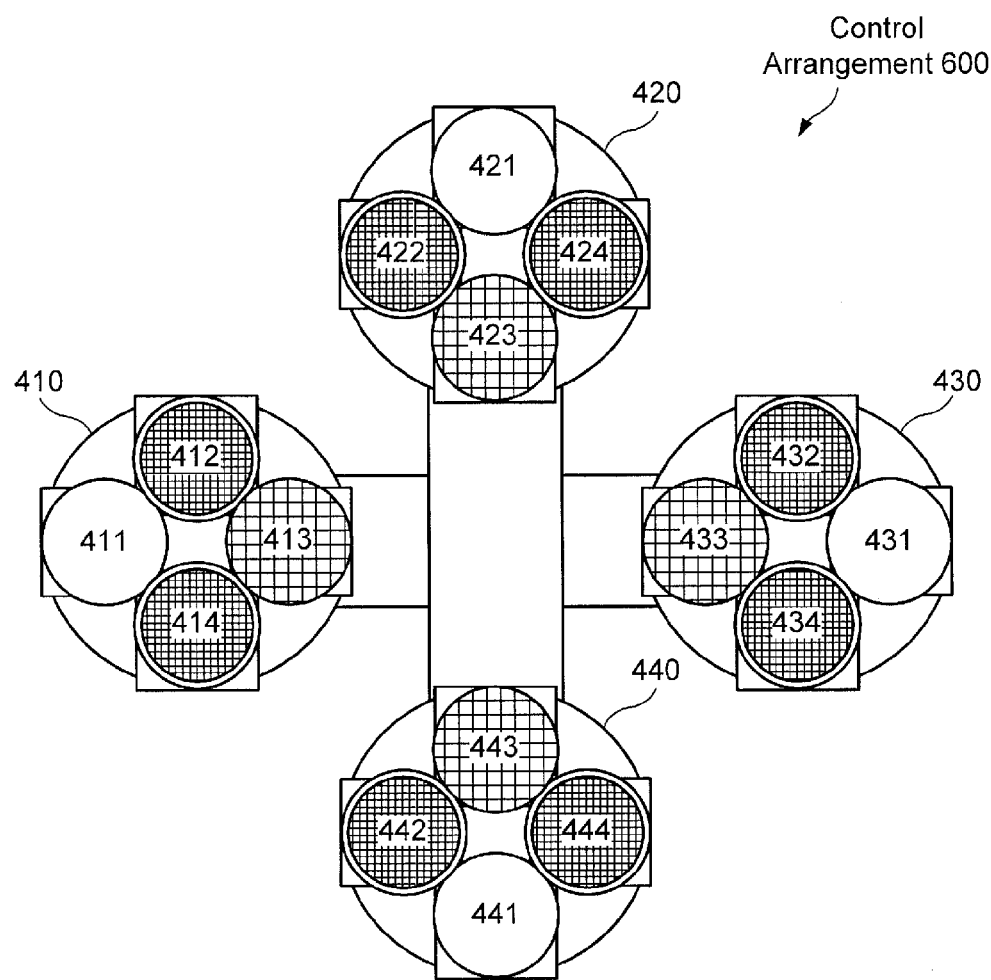
FIG. 10 shows a high fidelity control system for a 16-rotor architecture of a vehicle according to an exemplary embodiment.

FIG. 10 shows a high fidelity control arrangement 600 for a 16-rotor architecture of a vehicle according to an exemplary embodiment. As will be described in greater detail below, the control arrangement refers to the grouping of one or more of the thrusters and/or sub-thrusters into groups and the controlling of the thrusters/sub-thrusters in the group. Throughout this description, the thrusters and/or sub-thrusters that are grouped into the same group will be referred to as belonging to a specific "control group." It should be noted that control arrangement 600 will be discussed with reference to the 16-rotor model 400 of FIG. 4 and the basic model 200 of FIG. 2. The grouping for this exemplary control arrangement 600 as described in detail below is only exemplary and other groupings for the same 16-rotor model 400 are possible.

As noted above, the control method for the 16-rotor model 400 may utilize a similar quadrotor architecture control as the basic model 200. Specifically, the control method may adjust the roll and the pitch of the vehicle by increasing the thrust of one thrust component while decreasing the thrust of another thrust component (e.g., increasing the thrust of thruster 420 while decreasing the thrust of thruster 440). However, the exemplary high fidelity control arrangement 600 may implement a plurality of control groups for greater maneuverability and improved response time. For instance, the control arrangement 600 may use three separate control groups. While the example depicted in FIG. 10 for control arrangement 600 uses three control groups, it should be noted that any number of different control groups may be configured and utilized by the systems and methods described herein.

According to the exemplary control arrangement 600, a first control group may be to operate a single sub-thruster within each of the thrust components. For instance, the first mode may simply be to operate sub-thrusters 411, 421, 431, and 441 of the thrust components 410, 420, 430, and 440, respectively. Thus, the sub-thrusters 411, 421, 431, and 441 may be described as belonging to a first control group. The sub-thrusters associated with the first control group are depicted in FIG. 10 as the sub-thrusters shown as empty circles within each thrust component. Each of these sub-thrusters 411, 421, 431, and 441 may be equidistant from the center of the vehicle. Again, this grouping is only exemplary and other groupings are possible. In addition, it is not a requirement that each sub-thruster be equidistant from the center of the vehicle to belong to the first control group, this is merely one manner of grouping the sub-thrusters.

Similar to the first control group, a second control group may be sub-thrusters 413, 423, 433, and 443 of the thrust components 410, 420, 430, and 440, respectively. The sub-thrusters associated with the second control group are depicted in FIG. 10 as the sub-thrusters shown as circles filled with a large grid within each thrust component. Each of these sub-thrusters 413, 423, 433, and 443 may also be equidistant from the center of the vehicle. As illustrated in FIG. 10, the distance from center of the vehicle for the first control group of sub-thrusters is different from the distance from center of the vehicle to the second control group of sub-thrusters. Therefore, the torque applied to the vehicle from these two control groups will be different.

A third control group may include multiple sub-thrusters within each thrust component. For instance, the third control group may include the operation of both sub-thrusters 412 and 414 of thrust component 410, both sub-thrusters 422 and 424 of thrust component 420, both sub-thrusters 432 and 434 of thrust component 430, and both sub-thrusters 442 and 444 of thrust component 440. The sub-thrusters associated with the third control group are depicted in FIG. 10 as the sub-thrusters shown as circles filled with a small grid within each thrust component. Accordingly, the third control group may utilize the sub-thrusters pair of 412 and 414 to counter the sub-thruster pair of 432 and 434. Likewise, the sub-thrusters pair of 422 and 424 may be used to counter the sub-thruster pair of 442 and 444.

These three control groups may each be independent control systems and may be analogous to having three separate quadrotor control systems superimposed together within a single vehicle. If each of the control groups were to operate at the same time on the same control signal, the system response may be similar to that of the basic quadrotor model 200. However, the benefit of these multiple control groups would lie in operating the control groups independently of one another. As will be described below, the sub-thruster model 400 may use each independent control group to improve the maximum response time of the control system, improve frequency of response, and improve the robustness of the system.

It is also noted that in control arrangement 600 the three control groups are described as being static. For example, the first control group is described as including sub-thrusters 411, 421, 431, and 441. It is also possible that the groupings are dynamic and will be changed during operation. For example, the initial control groups may be as described above. However, during operation a control component may determine that a particular sub-thruster or group of sub-thrusters should be in a different control group (e.g., sub-thrusters 411 and 421 should be in the second control group rather than the first control group). Thus, the control component may move the sub-thrusters to another control group. In the example provided above, the sub-thrusters 411 and 421 can be grouped with the second control group and controlled with the sub-thrusters 413, 423, 433, and 443 of the second control group.

Figure 11:
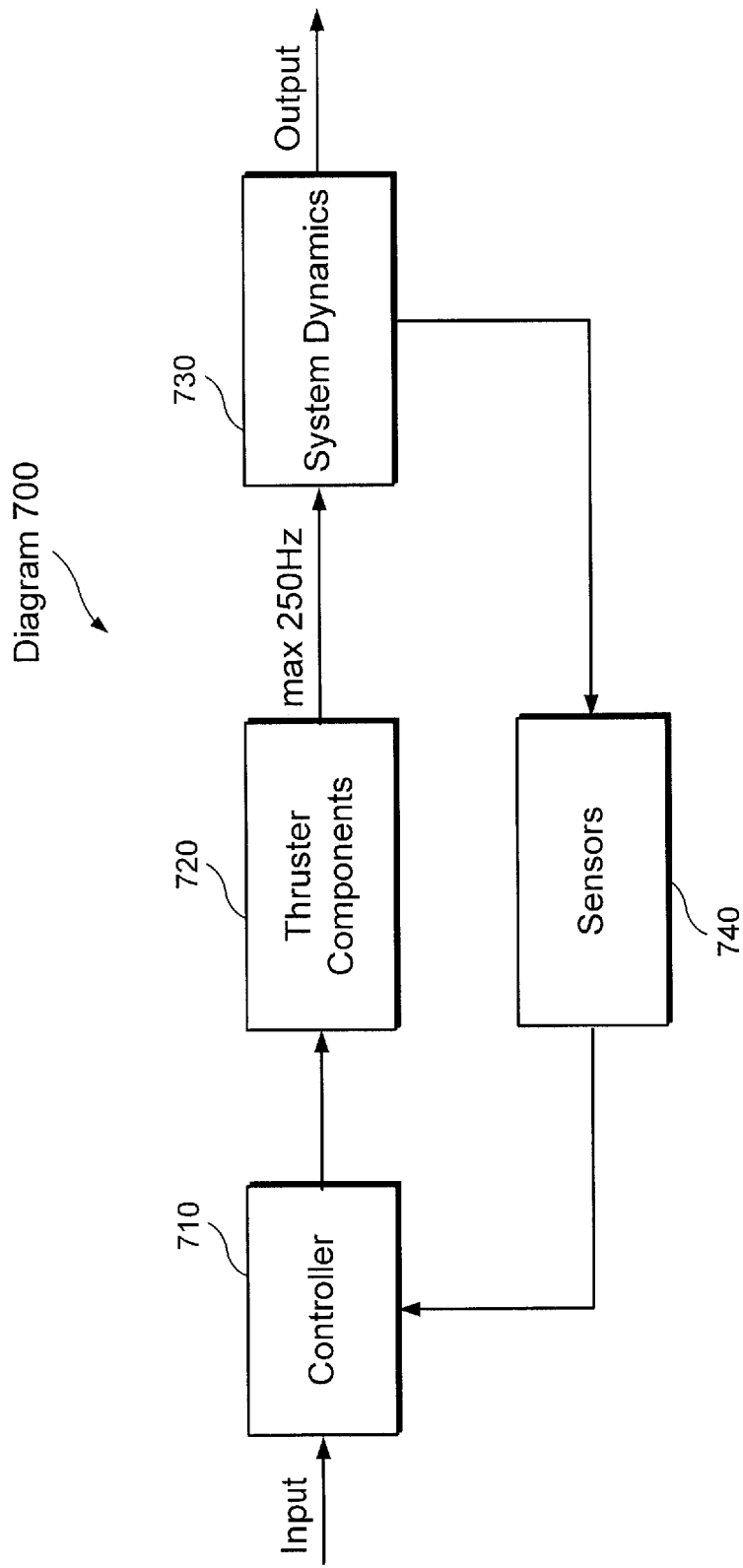
FIG. 11 shows a block diagram for operating the basic architecture according to an exemplary embodiment.

FIG. 11 shows a block diagram 700 for operating the basic architecture model 200 according to an exemplary embodiment. The basic architecture model 200 may include a controller 710 controlling the thrust components 720. As the thrust components 720 respond to the controller 710 input, the system (e.g., the vehicle) will experience certain system dynamics 730. The sensors 740 will measure these system dynamics 730 and provide that data to the controller 710 as feedback control to further control the thrust components 720. As an example, a step response time of the thrust components 720 within the basic model 200 may be 4 ms. Accordingly, the maximum frequency with which the basic model 200 may respond to inputs would be 250 Hz, as illustrated by the arrow between the thrust components 720 and the system dynamics 730. This response time would determine the time required for each of the components of the quadrotor to respond to an input from another component. It is noted that the step response time of the thrust component described above is only exemplary and that various types of thrust components may have different types of responses and/or response times.

Figure 12:
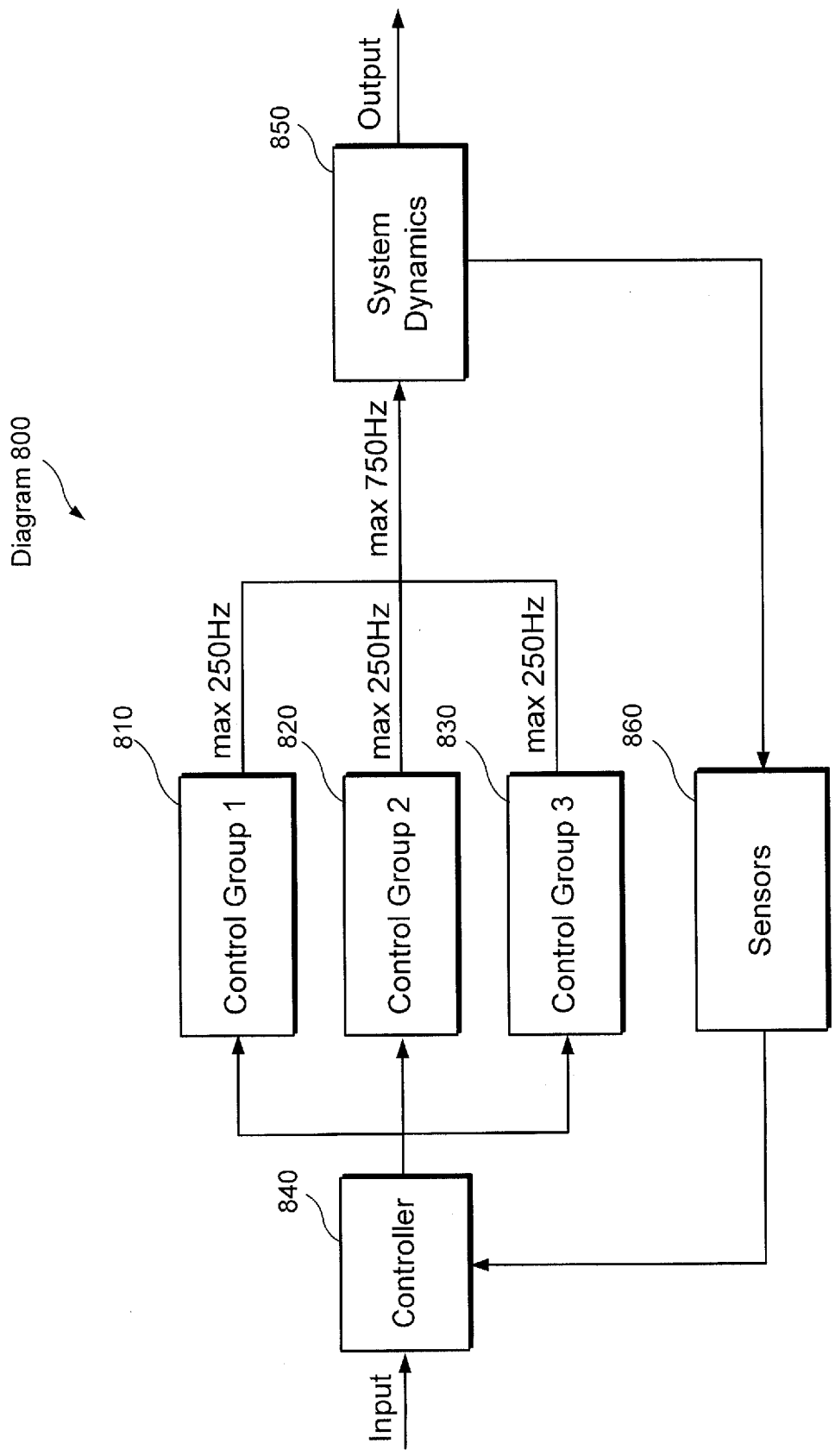
FIG. 12 shows a block diagram for operating a control mode of sub-thruster architecture according to an exemplary embodiment.

FIG. 12 shows a block diagram 800 for operating the control groups of control arrangement 600 according to an exemplary embodiment. The control arrangement 600 may include a controller 840 (or multiple controllers) controlling the sub-thruster components of the control groups 810-830. Similar to the basic arrangement described above, the sub-thruster components of each of the control groups 810-830 will cause system dynamics 850 for the vehicle. The sensors 860 will measure these system dynamics 850 and provide the data as feedback to the controller 840 which will then use the data to further control each of the control groups 810-830. As noted above, the control arrangement 600 makes use of the fact that each control group 810-830 is an independent control system, resulting in the fact that the exemplary embodiments employ multiple independent control systems.

In order to maximize the ability for each thrust/sub-thrust component to respond to new inputs, each of the independent control groups 810-830 may operate slightly out of phase from one another. For example, if each control group is operated at a frequency of 250 Hz because this is the step response time of the sub-thrust components, each control group may still operate at 250 Hz except each group may be controlled at ⅓ out of phase from the other groups. For instance, using the step response time of 4 ms described with respect to FIG. 11, control of the first group 810 may initiate at time zero. Control of the second group 820 may initiate at a time of zero plus ⅓ of the step response time, or 1.3 ms, later than the first group 810. Likewise, control of the third group 830 may initiate at a time of zero plus ⅔ of the step response time, or 2.6 ms, later than the first group 810. Furthermore, after a full 4 ms, the controller 840 returns to controlling operation of the first group 810. Thus, the overall system may update itself every 1.3 ms or at a rate of 750 Hz, however each individual control group 810-830 within the system may still only operate at a frequency of 250 Hz, as illustrated by the arrows between each of the control groups 810-830 and the system dynamics 850.

As described above, the use of three groups is only exemplary. Those skilled in the art will understand that additional control groups (e.g., groups of sub-thrusters) may further increase the control frequency of the entire system. The number of control groups may be influenced by the number of thrust components (e.g., 4, 6, 8, etc.) and the number of sub-thrusters in each thrust component. For example, as the number of thrust components and/or sub-thrusters increase, an increased number of control groups may be desirable. However, any actual grouping of thrust components and/or sub-thrusters will depend on the specific design of the particular vehicle to which the exemplary embodiments are applied.

The control arrangement 600 of the sub-thruster model 400 allows the systems step response to an offset angle to have lower overshoot and smaller steady state errors compared to the classic quadrotor system with a similar control logic. Reducing overshoot and steady state errors is important to a vehicle trying to maintain a specific position within three-dimensional space because any degree of error from the vehicle's neutral axis will cause the vehicle to begin accelerating and ultimately moving in a given direction. These accelerations, velocities, displacements and rotations will require the system to respond with forces in the opposite direction to compensate for this offset, thereby increasing undesirable movements and translations of the vehicle and thereby decreasing the overall stability and station keeping ability of the vehicle.

Figure 13:
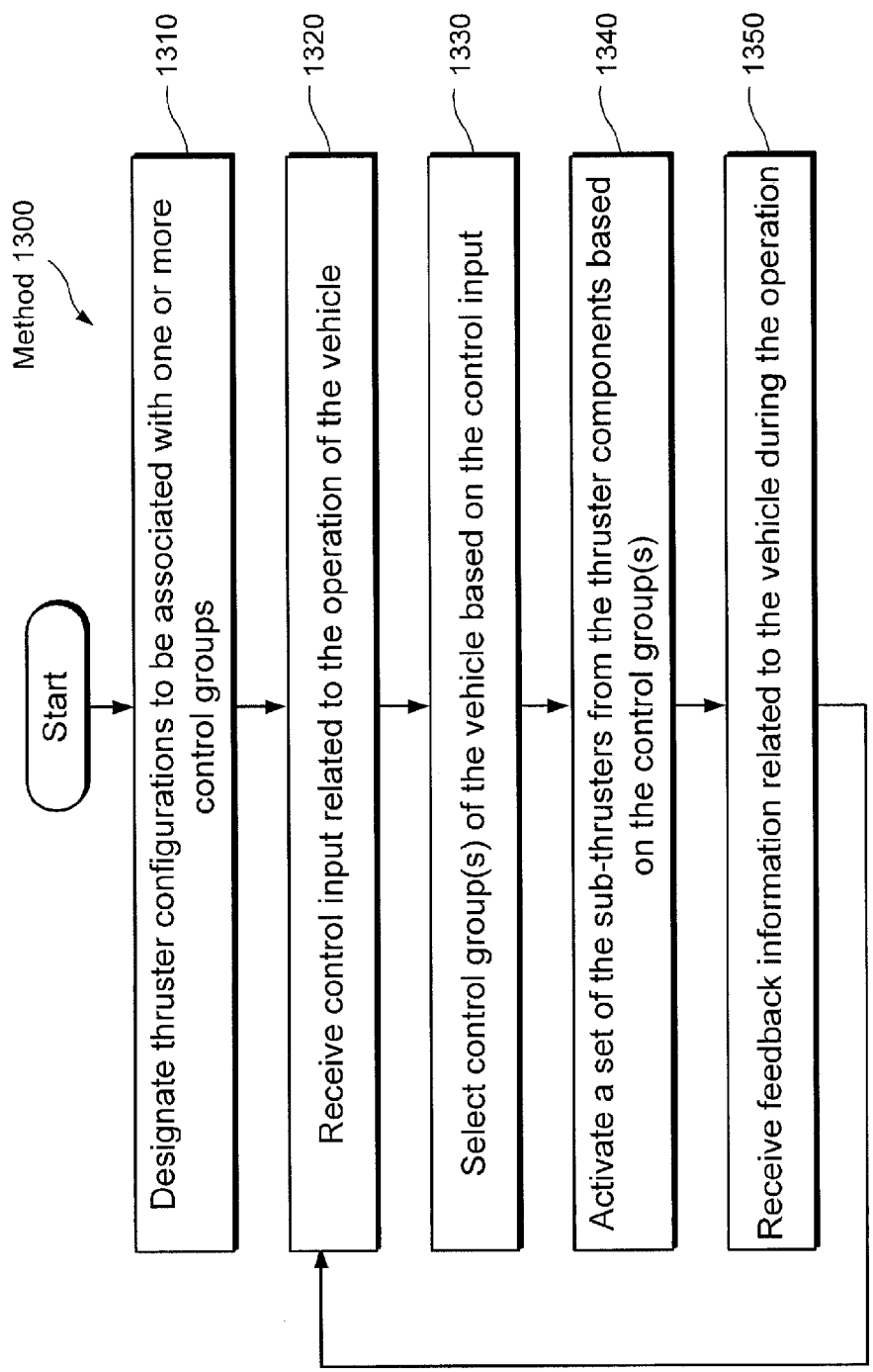
FIG. 13 shows an exemplary method for operating a high fidelity control systems for a multi-rotor architecture of a vehicle according to an exemplary embodiment.

FIG. 13 shows an exemplary method 1300 for operating a high fidelity control system for a multi-rotor architecture of a vehicle according to an exemplary embodiment. As detailed above, an exemplary sub-thruster model allows multiple independent control groups for improved input and response time between the components of the overall control system.

Beginning with step 1310, the control system may designate a plurality of thruster/sub-thrusters to be associated with at least one control group for the vehicle. As noted above, the control arrangement may include a plurality of control groups, such as the first, second and third control groups described above with reference to FIG. 10. For each of these control groups, the control system may strategically assign one or more sub-thrusters within a thrust component to a specific control group. The assignments of these sub-thrusters may be based on a common characteristic between each of the sub-thrusters, such as similar distance to the center of the vehicle. For instance, the outer-most sub-thrusters of each thrust component may be designated to the first control group, the inner-most sub-thrusters may be designed to the second control group, etc. However, as described above, there is no specific requirement that the sub-thrusters that are grouped for purposes of a control group share a specific characteristic such as a common location. The design of the individual vehicle may determine the optimal grouping for control of the vehicle.

It is also noted that in the exemplary method 1300 and step 1310, it is assumed that the groupings of the sub-thrusters into control groups is a static grouping. However, as described above, the grouping may be a dynamic grouping that changes over time or may be a grouping that is based on system dynamics or operational feedback. In such an instance, the control system would need feedback to determine the groupings. If such a dynamic grouping is used by the exemplary embodiment, then the control system would need feedback to select the groupings and the feedback provided by step 1350 to step 1320 (described in detail below) would also be provided to step 1310 for the purposes of grouping the sub-thrusters into control groups.

In step 1320, the control system may receive control input related to the operation of the vehicle. For instance, the control system may receive user input to activate a specific set of thrust components and/or sub-thruster. This user input may be an instruction for the vehicle to take-off, land, change direction, etc. In addition, the control input may be received from a feedback loop based on system dynamics or the environment in which the vehicle is operating. The feedback loop may relay general vehicle information such as position, velocity, acceleration, and bearing of the vehicle, thruster performance information such as efficiency, thrust, etc. and environmental information such as wind speed, wind direction, air pressure, etc. In general, any parameter that may aid the control system in determining expected system dynamics may be used as feedback. This feedback may be a combination of existing conditions and predictions. Therefore, based on either the user input and/or the feedback information, the control system may become aware of the current position and operation of the vehicle.

In step 1330, the control system may select one or more control groups of the vehicle based on the control input. Specifically, the control system may select one or more of the control groups of thrust components and sub-thrusters in order to control the vehicle correspondingly.

In step 1340, the control system may activate a set of the sub-thrusters associated with the selected control group. As noted above, the activation of sub-thrusters may be a single sub-thruster within each of the thrust components, or alternatively, may be a pair or grouping of common sub-thrusters within each thrust component. It is also noted that throughout this description, the exemplary control groups included at least one sub-thruster from each of the thruster components. However, it is not a requirement that each control group include at least one sub-thruster from each thruster component. For example, referring back to FIG. 10, a control group may be formed of the sub-thruster 421 of the thruster component 420 and the sub-thruster 441 of thruster component 440. Thus, in such an exemplary control group, there are no sub-thrusters from the thruster components 410 or 430.

In step 1350, the feedback loop control may receive feedback information related to the vehicle (e.g., vehicle parameters, thruster parameters, environmental parameters, etc.) during the operation of the selected control group. The feedback loop control may include system dynamics component(s) (e.g., sensors) for observing and reporting information related to the vehicle. This information may allow the control system to adjust one or more combination of the control groups to counter the detected movement, and thus may be vital in stabilizing the vehicle. Accordingly, the feedback loop control may prevent the vehicle from deviating from an intending location or direction, as well as preventing the vehicle from losing sufficient thrust to maintain a hovering position. Following step 1350, the feedback information may be transmitted back to the control system for processing.

Returning back to step 1320, the control system may receive the feedback information as control input and stabilize the configuration of thruster components arranged to control the vehicle. Upon processing the feedback information, the control system may continue through steps 1320 and 1340, wherein the control system may receiving additional input in step 1320, to control the sub-thrusters of the control group in step 1340 based on the new input provided by the feedback loop and/or the user. It is also noted that the control of the control groups may be continuous. For example, the control system may receive continuous feedback in step 1320 that is used to control each of the control groups. As described above, the control system may operate each control groups out of phase with the other control groups. Thus, as the feedback information is received, the control system may apply this feedback information to the control group that is currently being controlled. Thus, the selection of a control group in step 1330 may merely be the next control group that is scheduled for control update.

Figure 14:
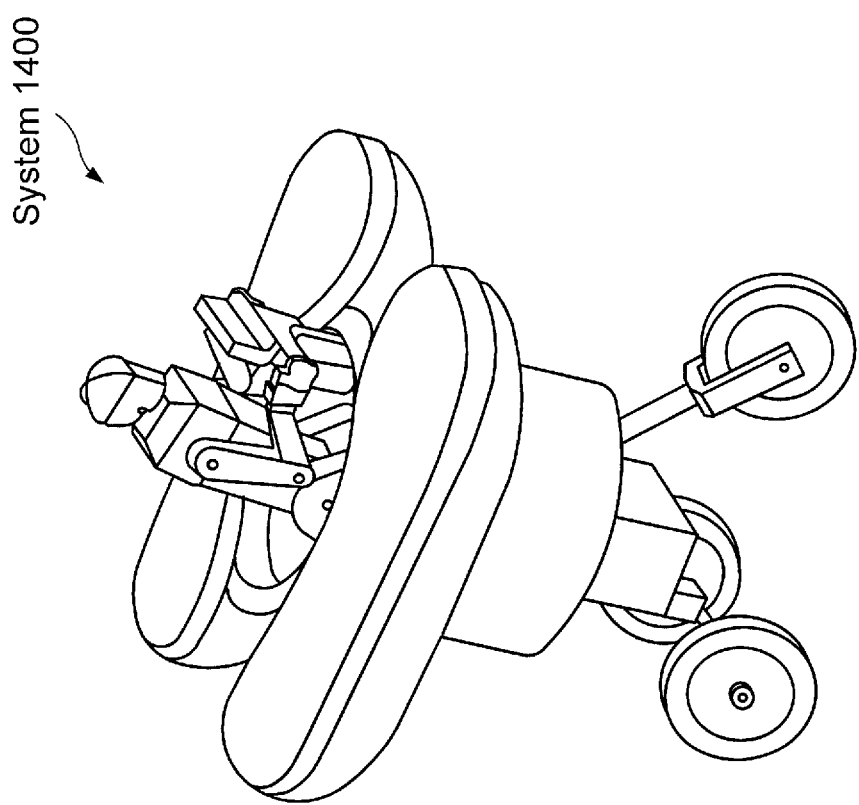
FIG. 14 shows an exemplary multi-rotor system for high fidelity control of a single passenger vehicle according to an exemplary embodiment.

FIG. 14 shows an exemplary multi-rotor system 1400 for high fidelity control of a single passenger vehicle according to an exemplary embodiment. The multi-rotor system 1400 includes a multi-axis stability and control system using differential thrusts as described above. For instance, the multi-rotor system 1400 may utilize a triple-redundant control system design and architecture (e.g., three independent control groups) for applications such as hovering, maneuvering, vertical take-off and landing, etc. This triple-redundant control system may include three independent control modes, wherein each mode operates out-of-phase from the other modes. Accordingly, this control system greatly reduces step response time between components of the system 1400. Thus, control and feedback information may be sent quickly, thereby improving the overall stability of the system 1400. The redundant system also allows for the system 1400 to quickly adapt to any failed thruster and/or sub-thruster because the out of phase independent control architectures will immediately react to the resulting system dynamics due to the failed thruster/sub-thruster. In addition, the high frequency system may also benefit the potential implementation of adaptive control systems because the higher frequency output will provide more feedback and thus allow the system to learn and optimize control laws better as well as adapt in the face of failures or unexpected problems. Also multiple control groups allow for different groups to be emphasized by an adaptive control method without changing control laws but changing the control weight, emphasis, or use of each control group.

As described above, the exemplary embodiments allow for the control system to adapt to failed and/or faulty sub-thrusters within a control group. The exemplary embodiments may also adapt to a multitude of other changes in system response due to factors that may include, for example, change in vehicle weight, change in vehicle inertia, or change in center of gravity. One exemplary manner of this adaptation is for the control system to compare the feedback information to the expected feedback information and determine if there is a variation between the actual feedback information and the expected feedback information. For example, the control system in providing control information to the control groups will expect the vehicle to operate in a certain manner in response to the control information. After providing this control information, the control system can compare the collected feedback information to determine if the expected result occurred. If the expected result did not occur, then this may reflect an issue with a sub-thruster component within the control group, or if the errors are displayed in multiple control groups it may reflect a system change.

Using the error data described above over time (e.g., the comparison of the expected information to the actual information) allows for numerical methods to model how to tune or adjust control parameters such that they reflect the new system response. This tuning and may include changing the control methods for one or more of the control groups, or increasing or decreasing the frequency or strength of one or more of the control groups. The effectiveness of using such adaptive learning or tuning methods will benefit from higher frequency information as well as the ability to not just change control laws but choose between using individual control groups more or less frequently, for more or less control commands, or with higher or lower power.

Figure 15:
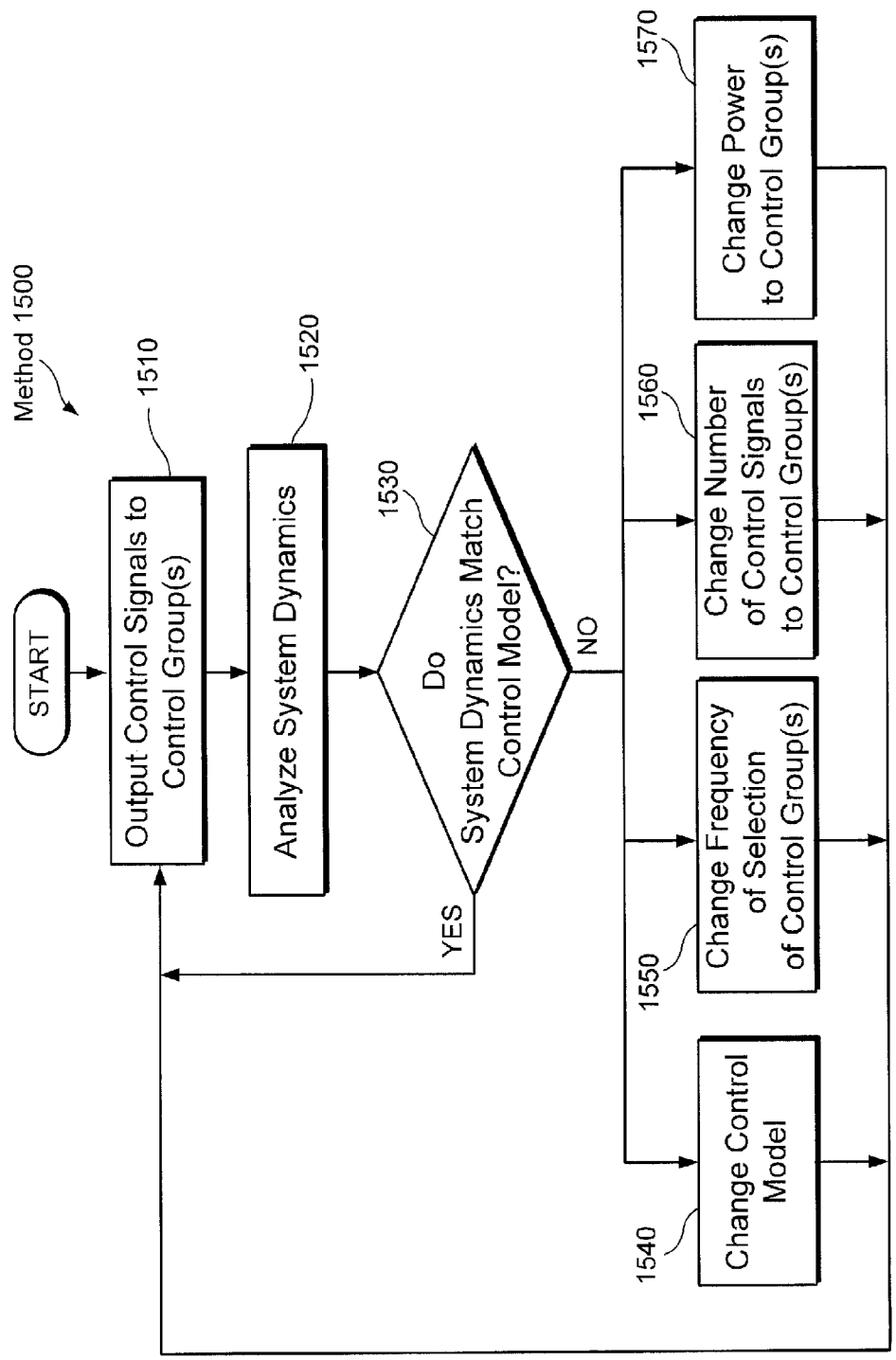
FIG. 15 shows an exemplary method for the exemplary high fidelity control system to adaptively learn and adjust during operation.

FIG. 15 shows an exemplary method 1500 for the exemplary control system to adaptively learn and adjust during operation. In step 1510, the control system (e.g., the controller) outputs control signals to one of more of the control groups. This step 1510 may encompass the functionality described above with respect to the steps 1330 and 1340 of the method 1300. The control signals that are output to the control groups may be based on a control model that may be a generic control model or a specific control model for the vehicle that the control system is controlling. For example, the control model may include the specific response that the control system should take based on the received parameters such as the vehicle parameters, environmental parameters, etc. In one example, the control model may be stored in the memory of a programmable controller. The control model may be based on expected results for the vehicle response (e.g., design parameters) or may also be based on empirical results of control responses.

In step 1520, the control system analyzes the system dynamics (e.g., the vehicle response to the applied control signals) based on the feedback information. In step 1530, the control system determines whether the actual system dynamics match the expected system dynamics based on the control model that is presently in use for the vehicle. It may do this by assessing the performance of the vehicle according to a function and storing this information in one or more performance parameters or it may simply determine if the actual system dynamics are within the error range for the model, the method may loop back to step 1510 where the control system continues to control the vehicle based on the received feedback and the control model.

However, if in step 1530, the control system determines that the actual system dynamics do not match the expected results for the control model, or if the control system is using determined system sensitivities and the performance parameters determined in step 1530, the control system may take any number of steps to adapt to the actual system dynamics or alter parameters affecting the way the system performs in any number of steps to adapt to the actual system dynamics. As an example, steps 1540-1570 will be described below. It should be noted that these steps 1540-1570 are only exemplary and that the control system may take any number of actions to adaptively learn and fine-tune its response to the system dynamics. It should also be noted that the actions described in steps 1540-1570 may be performed singly or multiple of the actions may be performed simultaneously or serially by the control system in order to adapt to the system dynamics.

In step 1540, the control system may determine that the present control model is not sufficient and the control system may change the control model for controlling the vehicle. Thus, it should be apparent that the control system may be capable of storing multiple control models or of changing parameters in the existing control model. For example, the different control model may be more appropriate for the environment in which the vehicle is operating, or a change in vehicle inertia may require a change in the control models parameters.

In step 1550, the action may be that the selection of a control group for control may be altered. For example, the control system may determine that a particular control group does not need to be controlled as frequently as the other control groups. Thus, the control frequency for this control group may be lowered. As described above, an exemplary control group had a response frequency of 250 Hz. However, this was described as the maximum response frequency. The control system may lower the frequency response (i.e., the frequency selection of the control group) to any lower response such as 200 Hz.

In step 1560, the action may be to change the number of control signals to one or more of the control groups. For example, the control frequency may be the same, but it may be that a first control group is not performing control actions effectively, while a second similar group is still operating fine. In such an example the two groups may have been taking control actions equally. However the system may adapt to allow the majority of control actions to be shifted to the second control group and only in the case of high demand control actions will the first group be called into action. Thus, in this step, the control system may change the number of control signals that are output to a control group.

In step 1570, the action may be to alter the amount of power to be output by the control group. For example, it may be that the control system determines that the system dynamics indicate that one of the sub-thrusters in a control group has failed based on the response of the vehicle to the control signals. Thus, the control system may lower or raise the amount of thrust power to be output by the control group including the failed sub-thruster to correct for the failed sub-thruster.

After the control system makes one or more of these changes or other changes to adaptively learn the response of the vehicle, the process may loop back to step 1510 where additional control signals are output to the control groups. This method 1500 may be a continuous method that is performed while the vehicle is operating in order to provide optimal performance.

In the exemplary embodiments, each of the architectures was described as including thrust components at four orthogonal locations. This is only exemplary as it is possible for a vehicle to include any number of thrust components such as three, six, eight, ten, twelve, etc., in any type of arrangement about the vehicle. In addition, the number of sub-thrusters within each thrust component was also described in the exemplary embodiments as four orthogonal sub-thrusters. However, there can also be any number of sub-thrusters within a thrust component having any type of arrangement. In addition, the same vehicle may have different numbers of sub-thrusters within different thrust components. Examples of alternative thruster and sub-thruster configurations were provided in FIGS. 5-9. However, those skilled in the art will understand that these are only a few examples of all the possible thruster and sub-thruster configurations to which the exemplary embodiments may be applied.

Exemplary embodiments of the systems and methods described herein may be implemented within any number of vehicle applications, such as, but not limited to, military operations, emergency response services, other extraordinary operations, etc. Furthermore, while an exemplary VTOL vehicle may be a single passenger vehicle, alternative embodiments may allow for scaled-up vehicles for more passengers and/or greater payload or unmanned vehicles (UAVs).

As noted above, the exemplary systems and methods for multi-axis stability and control is not limited to the use of VTOL aircraft and other vehicles in the air. The exemplary systems and methods may also be applied toward multi-axis stability and control of an underwater system and/or a space system. For instance, a space system including a remotely operated vehicle ("ROV") may exhibit high-fidelity controls using the exemplary systems and methods described herein. Likewise, an underwater vehicle with station-keeping and docking capabilities may be of great importance to entities, such as the Navy and oil industries. Oil spill disasters and relief demonstrate a need for better underwater vehicles with higher stability and control in adverse environments and conditions. These exemplary systems and methods may increase the capabilities of submarines, unmanned underwater vehicles ("UUVs") and autonomous underwater vehicles ("AUVs"), such as those implemented by various entities.

Those skilled in the art will understand that the above-described exemplary embodiments may be implemented in any number of manners, including, as a separate software module, as a combination of hardware and software, etc. For example, the multi-axis stability and control systems and methods may be a program containing lines of code stored on a non-transitory computer readable storage medium that, when compiled, may be executed on a processor. For example, the controller 840 described with reference to FIG. 12 may be a traditional hardware based PID controller. However, it may also be a simple programmable control element or even an embedded device that includes a complex set of programming codes to allow for control of the system.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A vertical take-off and landing ("VTOL") vehicle, comprising:
    a plurality of thruster components, wherein each of the thruster components includes a plurality of sub-thrusters, each sub-thruster being grouped into one of a plurality of independent control groups; and
    a plurality of independent control systems receiving information related to the vehicle, wherein each independent control system independently controls a corresponding one of the control groups, wherein a first of the independent control groups outputs control signals to the corresponding control group at a first frequency that starts at a first time and a second of the independent control groups outputs control signals to the corresponding control group at a second frequency that starts at a second time and wherein the first time and the second time are different.

2. The vehicle of claim 1, wherein the information related to the vehicle includes one of information relating to movement, location or orientation of the vehicle, information relating to the thruster components, information relating to other elements of the vehicle, information relating to the sub-thrusters and information relating to an environment in which the vehicle is operating.

3. The vehicle of claim 1, wherein at least one sub-thruster from each of the thruster components is grouped into each of the control groups.

4. The vehicle of claim 1, wherein each control group includes at least one sub-thruster from a plurality of thruster components, but not from all thruster components.

5. The vehicle of claim 1, wherein the first frequency and the second frequency are identical.

6. The vehicle of claim 1, wherein each of the sub-thrusters is one of a rotor engine, a fan, a propeller and a rocket.

7. The vehicle of claim 1, further comprising:
    a plurality of sensors generating the information and transmitting the information to the control system.

8. The vehicle of claim 1, wherein the VTOL vehicle is one of a submarine, an unmanned aerial vehicle ("UAV"), unmanned underwater vehicle ("UUV"), and a spacecraft.

* * * * *